United States Patent Office 3,542,792
Patented Nov. 24, 1970

3,542,792
PROCESS FOR THE PREPARATION OF BENZYL-(ORTHO - TERTIARY - AMINOALKOXY) BENZYL ETHERS
Gerhard Satzinger, Gundelfingen, Freiburg, Germany, assignor to Warner-Lambert Pharmaceutical Company, Morris Plains, N.J., a corporation of Delaware
No Drawing. Application Dec. 29, 1967, Ser. No. 694,362, now Patent No. 3,471,504, which is a continuation-in-part of application Ser. No. 432,917, Dec. 23, 1964. Divided and this application June 10, 1969, Ser. No. 832,017
Int. Cl. C07d 29/18
U.S. Cl. 260—294.7    1 Claim

ABSTRACT OF THE DISCLOSURE

Ortho-substituted aryloxyamines having local anesthetic activity, have the following formula:

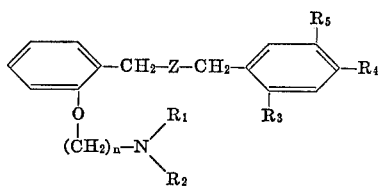

wherein $R_1$ and $R_2$ are either the same or different lower alkyl groups, or when taken with the amino nitrogen atom form a closed chain heterocyclic group; $R_3$, $R_4$ and $R_5$ may be the same or different groups such as hydrogen, halogen, lower alkyl and lower alkoxy; and $R_4$ and $R_5$ taken together form a methylene dioxy group; Z is oxygen or sulfur and the designation $n$ represents the integer 2 or 3. These compounds are prepared by reacting ortho-hydroxybenzaldehyde with a suitable dialkylaminoalkyl-halide, in the presence of an alkali metal carbonate, to obtain the corresponding ortho-(dialkylaminoalkoxy) benzaldehyde; reducing the aldehyde function to an alcohol; and reacting the ortho-(dialkylaminoalkoxy) benzyl alcohol with a suitable substituted benzyl halide to obtain the corresponding ortho-substituted aryloxyamines. Certain compounds within this class can also be used as antispasmodic, anti-inflammatory, anti-tussive, anti-pyretic, analgesic, antiarrhythmic, sedative and anticonvulsant agents.

CROSS REFERENCE TO RELATED APPLICATION

This application is a divisional application of my copending application, U.S. Ser. No. 694,362, filed Dec. 29, 1967, now U.S. Pat. 3,471,504, which in turn is a continuation-in-part of U.S. Ser. No. 432,917, Dec. 23, 1964, now abandoned.

BACKGROUND OF THE INVENTION

Many different compounds having antispasmodic activity have been synthesized, with the more active and useful of these compounds, in general, comprising complex molecular structures containing at least one ester linkage. The ester linkage has heretofore been generally accepted as necessary by analogy to naturally-occurring compounds which are related to the esters of tropic and pseudo-tropic acids. Such groupings have been considered essential in compounds in order for them to be sufficiently active as well as sufficiently safe for general pharmaceutical use. These compounds, however, are not wholly satisfactory since modification of the ester grouping may occur in several ways in the animal organism in which they may be used such to render the compounds ineffective, short-acting, irritating or possibly even highly toxic.

DESCRIPTION OF THE INVENTION

The invention relates to certain new and novel o-substituted aryloxyamines. More particularly, the present invention relates to o-substituted aryloxyamines having local anesthetic activity which have the Formula I:

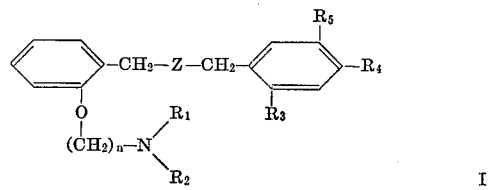

wherein $R_1$ and $R_2$ are either the same or different lower alkyl groups, or when taken with the amino nitrogen atom form a closed chain heterocyclic group; $R_3$, $R_4$ and $R_5$ may be the same or different and are hydrogen, halogen, lower alkyl, or lower alkoxy; and $R_4$ and $R_5$ taken together form a methylenedioxy group; Z is oxygen or sulfur and the designation $n$ represents the integer 2 or 3. The present invention also relates to a method for preparing these o-substituted aryloxyamines.

In accordance with the present invention, it has now been found the new and novel o-substituted aryloxyamine compounds of Formula I do not have the many objectionable properties which characterize other similarly useful compounds known heretofore.

It is, therefore, an object of this invention to provide a series of synthetic compounds which are physiologically active and which are not generally subject to the objectionable breakdown which frequently characterizes neutral or synthetic pharmacologically active esters.

It is also an object of this invention to provide new compounds useful as local anesthetic agents without major side effects or high toxicity.

It is a further object of this invention to provide o-substitued aryloxyamines having other useful pharmaceutical activities, which include antispasmodic, anti-inflammatory, antitussive, antipyretic, analgesic, antiarrhythmic, sedative, and anticonvulsant activities.

Further objects and advantages will be more apparent from the accompanying disclosure.

Compounds of the present invention may be prepared by first reacting o-hydroxybenzaldehyde with the hydrochloride salt of a substituted amino-chloroalkane according to the following reaction scheme:

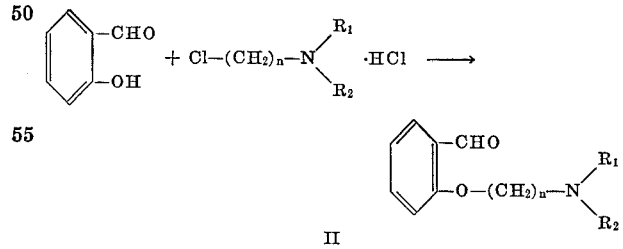

to form o-(substituted amino lower alkoxy) benzaldehyde. This reaction is desirably conducted at a temperature less than 100° C. and preferably about 60 to about 80° C. while in the presence of a weak alkali as the condensing agent, such as an alkali metal carbonate, and a polar solvent, such as a lower alkanol, dimethylforamide, dimethylsulfoxide, or tetrahydrofuran.

This use of a weak alkali as the condensing agent in combination with a polar solvent produces a surprising advantage in that increased yields and greater purity of final product are obtained. Prior art processes utilizing a strong alkali and a non-polar solvent are known to yield some condensation reaction on the aldehyde function of the o-hydroxybenzaldehyde starting material. In the novel process of this invention the reaction conditions are such that the total condensation reaction takes place on the hydroxy group of the o-hydroxybenzaldehyde starting material. Moreover, the preferred condensing agent, an alkali-metal carbonate, is inexpensive relatively easy to handle and does not involve any particular technical processing problems. The formed o-(substituted amino lower alkoxy) benzaldehyde can then be reduced to form the corresponding alcohol by reducing the aldehyde group either chemically such as by reaction with sodium borohydride or catalytically such as by reaction with hydrogen in the presence of a catalyst such as Raney nickel at a pressure desirably less than 100 atmospheres and at a temperature less than about 75° C. Desirably, the temperature is maintained in the range of about 20 to 40° C. The reduction of o-(substituted amino lower alkoxy) benzaldehyde proceeds according to the following reaction scheme:

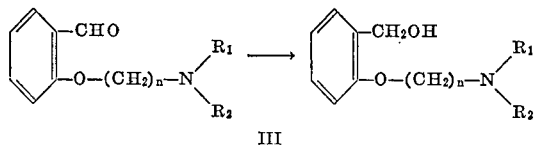

III

The product of the preceding reduction may then be processed to the oxygen either by direct reaction with a compound such as:

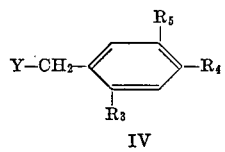

IV wherein Y is halogen and $R_3$, $R_4$ and $R_5$ are radicals as previously indicated, according to the following reaction:

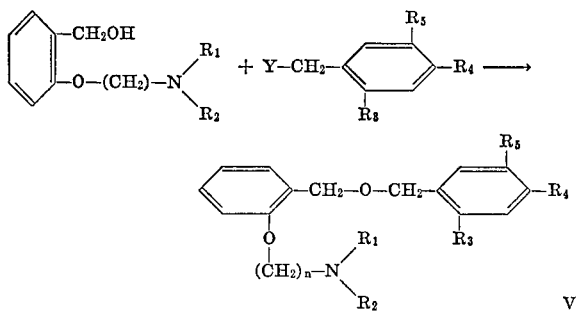

V

The preceding reaction may be desirably carried out in a reaction medium such as benzol, toluol, dimethylformamide, dimethylsulfoxide and the like, preferably free of water, and containing a strong basic material such as sodium hydroxide or sodium amide. The reaction temperature is desirably in the range of from about 30° C. to about 100° C.

Compounds of the present invention may also be prepared from the reaction product of Step III above by processing the reaction product to the thio-ether according to the following series of reactions. Initially, the prepared alcohol is reacted with thionyl chloride such as follows:

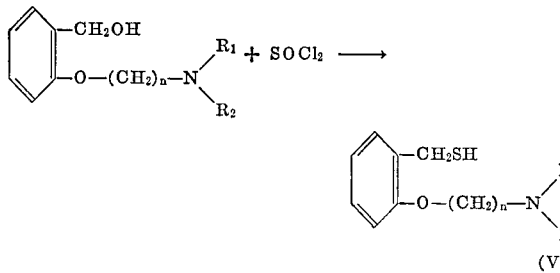

(VI)

in an organic reaction medium consisting of a suitable solvent such as benzol, methylene chloride, chloroform and the like at a temperature in the range from about 20° C. to about 60° C. Thereafter, the product of reaction Step VI may be further reacted with an excess amount of sodium hydrosulfide, preferably in the order of about 2 equivalents, at a temperature of about 60° C. to about 100° C. while maintained in a suitable reaction solvent such as methanol, ethanol and isopropanol. This reaction proceeds according to the following reaction sequence:

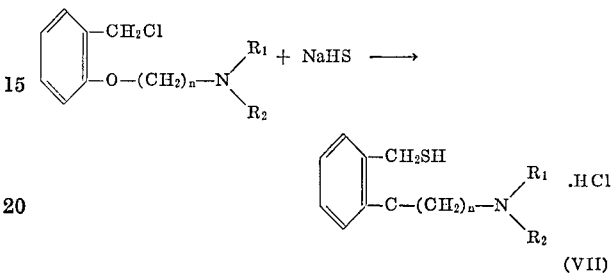

(VII)

The product of reaction Step VII may next be processed according to previously indicated reaction Step V to form the thio-ether according to the following:

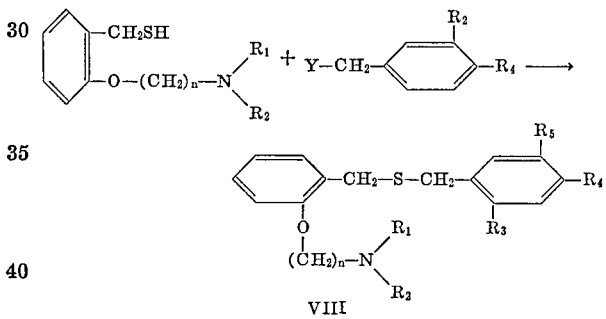

VIII while maintaining otherwise comparable reaction conditions.

If desired, the oxygen ethers prepared according to process Steps II–V and the thio-ethers prepared according to process Steps VI–VIII may be formed into useful acid salts. These salts include the quaternary ammonium salt, the hydrochloride salt, the oxalate salt or the like where applicable by procedures known to the art.

The pharmacologically acceptable salts of the ortho-substituted aryloxyamines of Formula I have excellent solubility in water. The hydrochloride salts are particularly useful in preparing pharmaceutical dosage forms. Another major advantage of the compounds of our invention is that the injection of their parenterally acceptable solutions into the mammalian body does not cause irritation or injury to the tissue.

The ortho-substituted aryloxyamines of Formula I can be used in the mammalian body as local anesthetic agents. To achieve local anesthetic action, the compounds may be applied topically or administered in an injectable form. The preparation of topical dosage forms such as creams, lotions, salves, and the like can be formulated with standard pharmaceutical excipients such as those given in Remington's Pharmaceutical Sciences, 13th Edition. For the injectable dosage forms sterile aqueous solutions can be formulated in the presence of parenterally acceptable buffers, e.g. sodium citrate, citric acid, sodium phosphate, and/or preservatives, e.g. phenol, methyl and propyl esters of p-hydroxybenzoic acid.

As an example of local anesthetic activity, one drop of a 0.5% to 1% aqueous solution of the compounds of this invention successfully anesthesies the cornea of the rabbit eye when applied topically to the conjunctival sac. Moreover, comparison with the standard anesthetic Pantocain (4′-butylamino-benzoyl-2-dimethylamino ethanol hydrochloride, LD 50, 45 mg./kg. in the mouse subcutaneously) has shown that the compounds of this invention are almost as effective as the standard, but 4 to 15 times less toxic. Duration of action is 50% to 75% as long as Pantocain, at a similar dosage level.

Ortho-substituted aryloxyamines of this invention having the following formula are particularly preferred because of the magnitude of their local anesthetic activity:

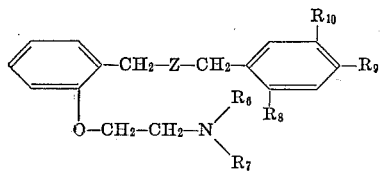

wherein $R_6$ and $R_7$ are lower alkyl, or, when taken together with the amino nitrogen atom, form a piperidino group; $R_8$, $R_9$ and $R_{10}$ are hydrogen or halogen; and Z is oxygen or sulfur; and the pharmaceutically acceptable, non-toxic acid addition salts thereof.

The terms "lower alkyl" and "lower alkoxy" as used in the specification and in the claims refer to members having branched and straight chain aliphatic groups and containing from 1 to 6 carbon atoms in the group. The term "heterocyclic" represents radicals such as piperidyl, morpholinyl, and piperazinyl. The term "halogen" refers to the radicals of bromine, chloride and iodine.

In order to further illustrate the present invention, the following examples (with additional pharmacological properties indicated) are given:

EXAMPLE 1 o-(β-Diethylaminoethoxy)benzaldehyde 122 gms. (1 mole) of o-hydroxybenzaldehyde is added to a suspension of 294 gms. potassium carbonate in 1.5 liters of 96% ethanol with rapid agitation at 60° C. Within twenty minutes, 172 gms. (1 mole) of N,N-diethyl-β-chloroethylamino hydrochloride is added in large portions and thereafter, the combined mass is refluxed for about 4 hours. The reaction mixture is then cooled, filtered, the solvent is distilled off and the residue is distributed between ether and water. The ether phase is recovered and dried. The residue of the ether phase is then distilled under 0.2 mm. vacuum at 123° C. 152 gms. of product are recovered.

EXAMPLE 2 o-(β-diethylaminoethoxy)benzyl alcohol 221 gms. (1 mole) of o-(β-diethylaminoethoxy)benzaldehyde is prepared according to the procedure of Example 1 and processed in one liter methanol containing 20 gms. Raney nickel, at a temperature of about 20° C. under 80 atmospheres hydrogen pressure for about 1½ hours. After the pressure on the system has been released, the reaction mass is filtered to remove the nickel. The filtrate is then distilled under 0.1 mm. vacuum at 121–122° C. to give 215 gms. residue product. In order to prepare the hydrochloride salt, the residue product is dissolved in ether and a sufficient quantity of HCl is added. The hydrochloride salt, isolated from the ether, is found to have a melting point of 123–124° C. and a percentage analysis as follows:

Calcd. (percent): C, 60.10; H, 8.54; N, 5.39; Cl, 13.65.
Found: (percent): C, 60.16; H, 8.32; N, 5.49; Cl, 13.45.

EXAMPLE 3 o-(β-Piperidinoethoxy)benzaldehyde 122 gms. (1 mole) of o-hydroxybenzaldehyde is added to a suspension of 233 gms. sodium carbonate in 2 liters of 96% ethanol with rapid agitation at 70° C. Within thirty minutes, 184 gms. (1 mole) of 1-(β-chlorethyl) piperidine hydrochloride is added in large portions and thereafter, the combined mass is refluxed for about 5 hours. The reaction mixture is then cooled, filtered, the solvent is distilled off and the residue is distributed between ether and water. The ether phase is recovered and dried. The residue of the ether phase is then distilled under 0.01 mm. vacuum at 123° C. 168 gms. of product are recovered.

EXAMPLE 4 o-(β-Piperidinoethoxy)benzyl alcohol 232 gms. (1 mole) of o-(β-piperidinoethoxy)benzaldehyde is prepared according to the procedure of Example 3 and processed in 1.5 liters ethanol containing 20 gms. Raney nickel, at a temperature of about 30° C. under 80 atmospheres hydrogen pressure for 2 hours. After the pressure on the system has been released, the reaction mass is filtered to remove the nickel. 212 gms. of product, isolated from the filtrate, is found to have a melting point of 85–86° C. and a percentage analysis as follows:

Calcd. (percent): C, 71.45; H, 9.00; N, 5.95; O, 13.60.
Found (percent): C, 71.65; H, 9.02; N, 6.23; O, 13.30.

EXAMPLE 5 o-(γ-Dimethylaminopropoxy)benzaldehyde 122 gms. (1 mole) of o-hydroxybenzaldehyde is added to a suspension of 294 gms. potassium carbonate in 2 liters isopropanol with rapid agitation at 60° C. Within thirty minutes, 158 gms. (1 mole) of (γ-chloropropyl)-dimethylamine hydrochloride is added in large portions and thereafter, the combined mass is heated for 5 hours at 80° C. The reaction mixture is then cooled, filtered, the solvent is distilled off and the residue is distributed between ether and water. The ether phase is recovered and dried. The residue of the ether phase is then distilled under 0.01 mm. vacuum at 98–100° C. 148 gms. of product are recovered.

EXAMPLE 6 o-(γ-Dimethylaminopropoxy)benzyl alcohol 207 gms. (1 mole) of o-(γ-dimethylaminopropoxy)benzaldehyde is prepared according to the procedure of Example 5 and processed in 1.5 liters methanol containing 20 gms. Raney nickel, at a temperature of about 20° C. under 70 atmospheres hydrogen pressure for 1½ hours. After the pressure on the system has been released, the reaction mass is filtered to remove the nickel. 190 gms. of product, isolated from the filtrate by 0.01 mm. vacuum distillation at 108° C., is converted to the hydrochloride salt. The hydrochloride salt is found to have a melting point of 131° C. and a percentage analysis as follows:

Calcd. (percent): C, 58.64; H, 8.20; N, 5.69; Cl, 14.42.
Found (percent): C, 58.99; H, 7.97; N, 5.71; Cl, 14.24.

EXAMPLE 7

Benzyl o-(β-piperidinoethoxy)benzyl ether hydrochloride 23.5 gms. (1/10 mole) of o-(β-piperidino ethoxy) benzyl alcohol is added dropwise to a flask containing a suspension at 70° C. of 3.9 gms. (1/10 mole) sodium amide in 200 ml. dry toluene. Thereafter, 12.7 gms. (1/10 mole) of benzyl chloride in 20 ml. dry toluene is added and the contents of the flask are refluxed for one hour. On cooling, ether is added, the solution is filtered and the filtrate saturated with hydrogen chloride gas. The resulting crystalline precipitate is then recrystallized from isopropanol. The hydrochloride salt is found to have a melting point of 172–173° C. Yield: 28 gms.

*Analysis.*—Calcd. (percent) C, 69.69 H, 7.80; N, 3.87; Cl, 9.79. Found (percent): C, 69.91; H, 7.77; N, 4.15; Cl, 9.88.

EXAMPLE 8 p-Chlorobenzyl o-($\beta$-piperidinoethoxy)benzyl ether hydrochloride 23.5 gms. (1/10 mole) of o-($\beta$-piperidino ethoxy) benzyl alcohol is added dropwise to a flask containing a suspension at 60° C. of 2.4 gms. (1/10 mole) sodium hydride in 100 ml. DMF. Thereafter, the mixture is stirred for ½ hour at 80° C. and cooled down to 5° C. 16.1 gms. (1/10 mole) of p-chlorobenzyl chloride is next added to the mixture with stirring at 5° C. Stirring is continued for one hour at 30° C. and for an additional ½ hour at 80° C. The solvent is then distilled off in vacuum and the residue is taken up in ether, washed twice with water and dried. The hydrochloride salt is formed with hydrogen chloride gas and the crystalline precipitate recrystallized from isopropanol. Yield: 32 gms. The hydrochloride salt is found to have a melting point of 140°–141° C.

*Analysis.*—Calcd. (percent): C, 63.63; H, 6.87; N, 3.54; Cl, 17.89. Found (percent): C, 63.64; H, 6.94; N, 3.68; Cl, 17.52.

This compound has an LD 50 of 700 mg./kg. of body weight administered subcutaneously in the mouse. In addition to the local anesthetic activity previously described, this compound can also be used as an analgesic, an antiflammatory agent and an antipyretic agent in the mmmalian body. For example, isotonic solutions containing from 50 to 100 mg./kg. based on mammalian body weight administered by injection are useful as analgesic, anti-inflammatory and/or antipyretic agents.

EXAMPLE 9 p-Chlorobenzyl o-($\beta$-dimethylaminoethoxy)benzyl ether hydrochloride 19.5 gms. (1/10 mole) of o-($\beta$-dimethylaminoethoxy) benzyl alcohol is added dropwise to a flask containing a suspension at 80° C. of 2.4 gms. (1/10 mole) sodium hydride in 100 ml. DMF. Thereafter 16.1 gms. (1/10 mole) of p-chlorobenzyl chloride is added slowly to the flask while vigorously stirring the contents at 30° C. The mixture is stirred for one hour at room temperature and then for one additional hour at 70–80° C. The solvent is distilled off in vacuum and the residue is taken up in ether, washed twice with a minimum amount of water and dried. Hydrogen chloride gas is used to form the hydrochloride salt and the resulting crystalline precipitate recrystallized from isopropanol. The hydrochloride salt is found to have a melting point of 167–169° C. Yield: 20.5 gms.

*Analysis.*—Calcd. (percent): C, 60.67; H, 6.51; N, 3.93; Cl, 19.90. Found (percent): C, 60.68; H, 6.64, N, 4.05; Cl, 19.78.

This compound has an LD 50 of 750 mg./kg. of body weight administered subcutaneously in the mouse. In addition to the local anesthetic activity previously described, it can be used as an antiarrhythmic agent in the mammalian body. Dosage levels of 1 to 4 mg./kg. based on mammalian body weight, administered by injection in an isotonic solution, are useful as antiarrhythmic agents.

EXAMPLE 10 o-Chlorobenzyl o-($\beta$-dimethylaminoethoxy)benzyl ether hydrochloride 19.5 gms. (1/10 mole) of o-($\beta$-dimethylaminoethoxy) benzyl alcohol is added dropwise to a flask containing a suspension at 80° C. of 2.4 gms. (1/10 mole) sodium hydride in 100 ml. DMSO. Thereafter, 16.1 gms. (1/10 mole) of o-chlorobenzyl chloride in 100 ml. DMSO is added slowly to the flask while stirring the contents at 30° C. The mixture is stirred for one hour at 30° C., one hour at 70° C. and concentrated under vacuum. The residue is taken up in ether, the ether is washed with water and dried over magnesium sulfate. Hydrogen chloride gas is used to form the hydrochloride salt and the resulting crystalline precipitate recrystallized from isopropanol. The hydrochloride salt is found to have a melting point of 131–132° C. Yield: 10 gms.

*Analysis.*—Calcd. (percent): C, 60.67; H, 6.51; N, 3.93; Cl, 19.90. Found (percent): C, 60.85; H, 6.55; N, 4.18; Cl, 19.74.

This compound has an LD 50 of 700 mg./kg. of body weight administered subcutaneously in the mouse. In addition to the local anesthetic activity previously described, it can be used as an anticonvulsant agent in the mammalian body. For anticonvulsant activity, dosage levels of 50 to 100 mg./kg., based on mammalian body weight administered by injection in an isotonic solution are effective as anticonvulsant agents.

EXAMPLE 11 o-Methylbenzyl o-($\beta$-diethylaminoethoxy)benzyl ether hydrochloride 22.3 gms. (1/10 mole) of o-($\beta$-diethylaminoethoxy) benzyl alcohol is added dropwise to a flask containing a boiling suspension of 2.4 gms. (1/10 mole) sodium hydride in 200 ml. anhydrous toluene. After the sodium hydride was reacted, 14 gms. (1/10 mole) of o-methylbenzyl chloride is quickly added and the flask heated to reflux for 4 hours. On cooling, the mixture is diluted with 1 liter ether, filtered, and the filtrate is saturated with hydrogen chloride gas. The precipitate is recovered and recrystallized from isopropanol. The hydrochloride salt is found to have a melting point of 135° C. Yield: 17.5 gms.

*Analysis.*—Calcd. (percent): C, 69.30; H, 8.31; N, 3.85; Cl, 9.74. Found (percent): C, 69.08; H, 8.52; N, 3.89; Cl, 10.03

EXAMPLE 12 o-Methoxybenzyl o-($\beta$-diethylaminoethoxy)benzyl ether hydrochloride 22.3 gms. (1/10 mole) of o-($\beta$-diethylaminoethoxy) benzyl alcohol is added dropwise to a flask containing a boiling suspension of 2.4 gms. (1/10 mole) sodium hydride in 200 ml. absolute toluene. After the sodium hydride has reacted, 15.6 gms. (1/10 mole) of o-methoxybenzyl chloride in 50 ml. absolute toluene is added and the flask heated to reflux for 4 hours. On cooling, the mixture is diluted with 1 liter of ether, stirred with activated charcoal, and filtered. The filtrate is saturated with hydrogen chloride gas and the precipitated salt is crystallized from acetic acid/isopropanol. The hydrochloride salt is found to have a melting point of 149–150° C. Yield: 14 gms.

*Analysis.*—Calcd. (percent): C, 66.38; H, 7.96; N, 3.69; Cl, 9.33. Found (percent): C, 66.44; H, 8.28; N, 4.07; Cl, 9.57.

EXAMPLE 13 p-Methoxybenzyl o-($\beta$-diethylaminoethoxy)benzyl ether hydrochloride 22.3 gms. (1/10 mole) o - ($\beta$ - diethylaminoethoxy) benzyl alcohol dissolved in 100 ml. absolute toluene is added to a flask containing a boiling suspension of 2.4 gms. (1/10 mole) sodium hydride in 100 ml. absolute toluene. After the sodium hydride has reacted, 15.6 gms. (1/10 mole) of p-methoxybenzyl chloride is added to the flask dropwise which is then heated to reflux for 5 hours. On cooling, the mixture is diluted with 1 liter of ether, stirred with activated charcoal, and filtered. The filtrate is concentrated and the residue is distilled at 0.01 mm.

vacuum at 164° C. 13 gms. of product are recovered. The hydrochloride salt, recrystallized from glacial acetic acid, is found to have a melting point of 133.5° C.

*Analysis.*—Calcd. (percent): C, 66.38; H, 7.96; N, 3.69; Cl, 9.33. Found (percent): C, 66.12; H, 7.66; N, 3.97; Cl, 9.27.

EXAMPLE 14 o-(β-diethylaminoethoxy)benzyl 3,4-methylenedioxybnezyl ether hydrochloride 22.3 gms. (1/10 mole) of o-(β-diethylmainoethoxy) benzyl alcohol is added to a flask containing a suspension at 70° C. of 2.4 gms. (1/10 mole) sodium hydride in 100 ml. dried DMF. The mass is stirred for 15 minutes and after sufficient cooling, a solution of 17 gms. (1/10 mole) piperonyl chloride in 50 ml. dried DMF is added to the flask which is then heated slowly to 80° C. Stirring is continued at 80° C. for one hour after which the solvent is removed by vacuum and the residue taken up in ether, washed with water and dried. Upon processing the residue with hydrogen chloride gas, an oil precipitates which crystallizes on contact with acetone. The acid salt, recrystallized from acetone, is found to have a melting point of 116–117° C. Yield: 13 gms.

*Analysis.*—Calcd. (percent): C, 64.02; H, 7.17; N, 3.56; Cl, 9.01. Found (percent): C, 63.92; H, 7.16; N, 3.50; Cl, 8.84.

EXAMPLE 15 o-(β-diethylaminoethoxy)benzyl 2,4-dimethylbenzyl ether oxalate 22.3 gms. (1/10 mole) of o-(β-diethylaminoethoxy)- benzyl alcohol is added dropwise to a flask containing a boiling suspension of 3.9 gms. sodium amide in 150 ml. anhydrous toluene. After the sodium amide has reacted, a solution of 15.4 gms. (1/10 mole) 2,4-dimethylbenzyl chloride in 50 ml. absolute toluene is added slowly and the flask heated to reflux for 5 hours. On cooling, the mixture is diluted with 1 liter of ether, stirred with activated charcoal, and filtered. The filtrate is saturated with hydrogen chloride gas and the precipitated product is separated, made alkaline with 2 N sodium hydroxide and the separated base taken up in ether. After drying, the oxalate is precipitated by means of an ethereal oxalate solution and recrystallized from glacial acetic acid/isopropanol. The oxalate salt is found to have a melting point of 115.5° C.–116.5° C. Yield: 19 gms.

*Analysis.*—Calcd. (percent): C, 66.80; H, 7.71; N, 3.25. Found (percent): C, 66.77; H, 7.63; N, 3.44.

EXAMPLE 16 o-(β-diethylaminoethoxy)benzyl 3,4-dimethylbenzyl ether oxalate

A solution of 22.3 gms. (1/10 mole) of o-(β-diethylaminoethoxy)benzyl alcohol in 50 ml. absolute toluene is added dropwise to a flask containing a boiling suspension of 2.4 gms. (1/10 mole) sodium hydride in 100 ml. anhydrous toluene. On conclusion of the reaction, a solution of 15.4 gms. (1/10 mole) 3,4-dimethylbenzyl chloride in 20 ml. absolute toluene is slowly added and the flask heated to reflux for 4 hours. On cooling, the mixture is diluted with 1 liter of ether and filtered. The filtrate is next saturated with hydrogen chloride gas and then made alkaline with 2 N sodium hydroxide. The separated oil is taken up in ether and dried. The dried product is then distilled in 0.05 mm. vacuum at 153–155° C. The prepared oxalate salt is found to have a melting point of 110–111° C. Yield: 18 gms.

*Analysis.*—Calcd. (percent): C, 77.37; H, 9.15; N, 4.11; O, 9.37. Found (percent): C, 77.25; H, 9.09; N, 4.15; O, 8.98.

EXAMPLE 17 o-(β-diethylaminoethoxy)benzyl 2,5-dimethylbenzyl ether hydrochloride 22.3 g. (1/10 mole) of o-(β-diethylaminoethoxy)- benzyl alcohol is added to a flask containing a suspension of 2.4 gms. (1/10 mole) sodium hydride in 100 ml. boiling absolute toluene. After the sodium hydride has reacted, a solution of 15.4 gms. (1/10 mole) 2,5-dimethylbenzyl chloride in 20 ml. absolute toluene is added to the flask which is heated to reflux for 4 more hours. On cooling, the mixture is diluted with 1 liter of ether, stirred with activated charcoal, and filtered. The filtrate is saturated with hydrogen chloride gas and the precipitated product recovered. The precipitated product is then recrystallized from glacial acetic acid/isopropanol. The recovered hydrochloride salt is found to have a melting point of 154–155° C. Yield: 21 gms.

*Analysis.*—Calcd( percent): C, 66.80; H, 7.71; N, 3.25. 3.71; Cl, 9.38. Found (percent): C, 69.54; H, 8.44; N, 3.89; Cl, 9.27.

EXAMPLE 18

2,4-dichlorobenzyl o-(β-diethylaminoethoxy)- benzyl ether hydrochloride 22.3 gms. (1/10 mole) of o-(β-diethylaminoethoxy)- benzyl alcohol dissolved in 20 ml. absolute toluene is added dropwise to a flask containing a suspension of 2.4 gms. (1/10 mole) sodium hydride in 150 ml. absolute boiling toluene. After the sodium amide has reacted, a solution of 19.5 gms. (1/10 mole) 2,4-dichlorobenzyl chloride in 20 ml. absolute toluene is slowly added and the contents of the flask heated to reflux for 4 hours. On cooling, the mixture is diluted with 1 liter ether, stirred with activated charcoal, and filtered. The filtrate is saturated with hydrogen chloride gas, the precipitate is recovered and recrystallized from glacial acetic acid/isopropanol. The recovered hydrochloride salt is found to have a melting point of 130.5–131° C. Yield: 18.5 gms.

*Analysis.*—Calcd. (percent): C, 57.35; H, 6.25; N, 3.35; Cl, 25.40. Found (percent): C, 57.52; H, 5.97; N, 3.39; Cl, 25.23.

EXAMPLE 19 o-(γ-dimethylaminopropoxy)benzyl 3,4-methylenedioxybenzyl ether hydrochloride 24.5 gms. (1/10 mole) of o-(γ-dimethylaminopropoxy)benzylalcohol is added to a flask containing, at 80° C., a suspension of 2.4 gms. (1/10 mole) sodium hydride in 150 ml. absolute DMF. After the sodium amide has reacted, the mixture is cooled to 20° C. and reacted with a solution of 17 gms. (1/10 mole) piperonyl chloride in 50 ml. DMF. The reaction mass is then stirred at 20° C. for ½ hour. Thereafter, the solution is heated within ½ hour to 60° C. and then concentrated under vacuum. The residue, taken up in ether, is extracted with water, filtered and dried. After processing with hydrogen chloride gas, an oil which separates solidifies after several hours. Upon recrystallization from isopropanol, the recovered hydrochloride salt is found to have a melting point of 105–106° C. Yield: 17 gms.

*Analysis.*—Calcd. (percent): C, 63.23; H, 6.90; N, 3.69; Cl, 9.34. Found (percent): C, 62.90; H, 6.67; N, 4.03; Cl, 9.37.

EXAMPLE 20

Benzyl o-(β-diethylaminoethoxy)benzyl sulfide oxalate 22.3 gms. (1/10 mole) of o-(β-diethylaminoethoxy) benzyl alcohol is added to a flask and dissolved in 100 ml. chloroform. With occasional cooling, the contents of the flask is then reacted with 50 gms. thionyl chloride, and the mixture heated to reflux for 2 hours. On cooling, the mixture is diluted with ether upon which the hydrochloride salt of o-(β-diethylaminoethoxy)benzyl chloride precipitates. The hydrochloride salt is found to have a melting point of 135° C. Yield: 26 gms.

4.6 gms. sodium (⅕ mole) is dissolved under a nitrogen atmosphere in 150 ml. absolute ethanol. 6.8 gms. of hydrogen sulfide is then bubbled into this solution of sodium ethoxide under a protective atmosphere of hydrogen sulfide. With vigorous stirring, an ethanolic solution of 27 gms. (⅒ mole) o-(β-diethylaminoethoxy)benzyl chloride hydrochloride is next added dropwise. Thereafter, the mixture is stirred and refluxed for one additional hour while a strong stream of hydrogen sulfide is being bubbled therein. The ethanol is stripped off and the residue partitioned between benzene and water. The benzene phase is next dried with care being taken that enough benzene is added so that the residue at the end is free of water. The crude o-(β-diethylmaninoethoxy)benzyl mercaptan (19.1 gms.) is recovered and added to a suspension of 1.9 gms. (²⁄₂₅ mole) sodium hydride in absolute toluene under nitrogen at 60° C. The mass is stirred at 60° C. until the sodium hydride has reacted. Thereafter, 10.1 gms. (²⁄₂₅ mole) benzyl chloride is quickly added and the mass heated to reflux for 2 hours. On cooling, the mass is extracted with dilute hydrochloric acid, the extract is overlayed with ether and a paste liberated with 4 N sodium hydroxide. The ether phase is stripped, dried and the residue distilled in 0.5 mm. vacuum at 192–204° C. The prepared oxalate salt is found to have a melting point of 89–90° C. Yield: 16 gms.

Analysis.—Calcd. (percent): C, 63.13; H, 6.75; N, 3.35; S, 7.66. Found (percent): C, 63.25; H, 7.05; N, 3.57; S, 7.46.

This compound has an LD 50 of 600 mg./kg. of body weight administered subcutaneously in the mouse. In addition to the local anesthetic activity previously described, it can be used as an antispasmodic agent in the mammalian body. Dosage levels of 2 mg./kg. based on mammalian body weight, administered by injection in an isotonic solution are useful as antispasmodic agents.

EXAMPLE 21 o-Chlorobenzyl o-(β-diethylaminoethoxy)benzyl sulfide oxalate 19.1 g. (²⁄₂₅ mole) of o-(β-diethylaminoethoxy)benzylmercaptan is dissolved in 50 ml. benzene and the solution added to a flask containing a suspension of 1.9 gms. (²⁄₂₅ mole) sodium hydride in absolute benzene under nitrogen at 60° C. After the sodium hydride has reacted, a solution of 13 gms. (²⁄₂₅ mole) of o-chlorobenzyl chloride in 20 ml. benzene is added dropwise to the flask which is then heated to reflux for 3 hours. On cooling, the benzene phase is extracted with 2 N hydrochloric acid, the extract is overlayed with ether and made alkaline with 4 N sodium hydroxide. The ether phase is stripped, dried and concentrated. The residue is distilled in 0.3 mm. vacuum at 196–198° C. The prepared oxalate salt is found to have a melting point of 114.5–115° C. Yield: 14.5 gms.

Analysis.—Calcd. (percent): C, 58.33; H, 6.01; N, 3.09; S, 7.08; Cl, 7.83. Found (percent): C, 58.08; H, 6.25; N, 3.01; S, 6.79; Cl, 7.61.

EXAMPLE 22 p-Chlorobenzyl o-(β-diethylaminoethoxy)benzyl ether hydrochloride

The procedure of Example 9 is followed using, as the starting materials, o-(β-diethylaminoethoxy)benzyl alcohol and p-chlorobenzyl chloride. A ⅒ mole batch is employed. The residue of the etheral solution is distilled at 0.1 mm. vacuum at 175° C. 15 gms. of product are recovered. The hydrochloride salt, recrystallized from isopropanol is found to have a melting point of 97–95.5° C.

Analysis.—Calcd. (percent): C, 62.49; H, 7.08; N, 3.65; Cl, 18.45. Found (percent): C, 62.62; H, 7.08; N, 4.01; Cl, 18.29.

This compound has an LD 50 of 400 mg./kg. of body weight administered subcutaneously in the mouse. In addition to the local anesthetic activity previously described, it can be used as a sedative and as an antispasmodic in the mammalian body.

Dosage levels of 50 to 100 mg./kg. based on the mammalian body weight administered by injection of an isotonic solution are useful as sedatives. Dosage levels of 2 to 5 mg./kg. based on mammalian body weight administered by injection in an isotonic solution are useful as antispasmodic agents.

EXAMPLE 23

Benzyl o-(β-diethylaminoethoxy)benzyl ether hydrochloride

The procedure of Example 11 is followed, using as the starting materials, o-(β-diethylaminoethoxy)benzyl ether and benzylchloride. A ⅒ mole batch is employed. A crystalline solid precipitates when hydrogen chloride gas is passed into the dry etheral solution of the raw base. The precipitate is recovered and recrystallized from isopropanol. The hydrochloride salt is found to have a melting point of 101–102° C. Yield: 9.4 gms.

Analysis.—Calcd. (percent): C, 68.65; H, 8.06; N, 4.01; Cl, 10.14. Found (percent): C, 68.57; H, 8.07; N, 4.20; Cl, 10.28.

The LD 50 of this compound is 200 mg./kg. of body weight administered subcutaneously in the mouse. In addition to the local anesthetic activity previously described, it can be used as an antitussive agent in the mammalian body. Dosage levels of 5 to 20 mg./kg. based on mammalian body weight administered from an isotonic solution by the injectable route are useful as antitussive agents.

I claim:

1. A method for the preparation of an o-substituted aryloxyamine having the following formula:

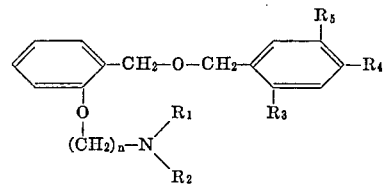

wherein $R_1$ and $R_2$ are members selected from the group consisting of lower alkyl, and, when taken together with the amino nitrogen atom, form piperidino; $R_3$ and $R_4$ are members selected from the group consisting of hydrogen, halogen, lower alkyl and lower alkoxy; $R_5$ is a member selected from the group consisting of hydrogen, halogen, and lower alkyl; and $R_4$ and $R_5$ when taken together form methylene dioxy; and $n$ is an integer of from 2 to 3; and the pharmaceutically acceptable, non-toxic acid addition salts thereof which comprises (A) Reacting o-hydroxybenzaldehyde at a temperature less than 100° C. in the presence of alkali metal carbonate and a solvent selected from the group consisting of lower alkanol, dimethylformamide, dimethylsulfoxide and tetrahydrofuran with a substituted amino chloro-alkane having the following formula:

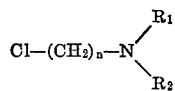

to form a componnd of the formula:

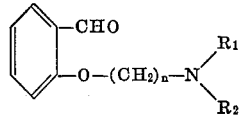

(B) Reducing the product of Step (A) to form the corresponding alcohol (C) Reacting the product of Step (B) with a compound of the general formula:

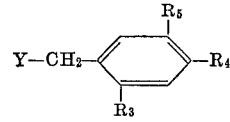

wherein Y is halogen, in a reaction medium free of water and containing a strong basic material, and (D) Recovering o-substituted aryloxy amine as the reaction product.

References Cited
UNITED STATES PATENTS 3,047,628  7/1962  Goldberg et al. ____ 260—570.7

HENRY R. JILES, Primary Examiner

S. D. WINTERS, Assistant Examiner

U.S. Cl. X.R.

260—570.7, 340.5